United States Patent
Lee et al.

(10) Patent No.: US 10,560,389 B2
(45) Date of Patent: Feb. 11, 2020

(54) METHOD AND APPARATUS FOR CONTROLLING SEND BUFFER OF TRANSMISSION CONTROL PROTOCOL IN COMMUNICATION SYSTEM

(71) Applicant: Samsung Electronics Co., Ltd., Suwon-si, Gyeonggi-do (KR)

(72) Inventors: Jin-Sung Lee, Suwon-si (KR); Young-Bin Im, Boulder, CO (US); Sangtae Ha, Louisvelle, CO (US); Sang-Jun Moon, Yongin-si (KR); Jung-Shin Park, Seoul (KR); Ji-Cheol Lee, Suwon-si (KR); Joo-Hyung Lee, Gwacheon-si (KR)

(73) Assignees: Samsung Electronics Co., Ltd., Suwon-si (KR); The Regents of the University of Colorado A Body Corporate, Denver, CO (US)

( * ) Notice: Subject to any disclaimer, the term of this patent is extended or adjusted under 35 U.S.C. 154(b) by 47 days.

(21) Appl. No.: 15/656,466

(22) Filed: Jul. 21, 2017

(65) Prior Publication Data

US 2018/0026899 A1 Jan. 25, 2018

(30) Foreign Application Priority Data

Jul. 21, 2016 (KR) .......................... 10-2016-0092784

(51) Int. Cl.
*H04L 12/26* (2006.01)
*H04L 12/841* (2013.01)
*H04L 12/807* (2013.01)

(52) U.S. Cl.
CPC ........ *H04L 47/283* (2013.01); *H04L 43/0864* (2013.01); *H04L 47/27* (2013.01); *H04L 43/16* (2013.01)

(58) Field of Classification Search
None
See application file for complete search history.

(56) References Cited

U.S. PATENT DOCUMENTS

| 8,150,995 B2 | 4/2012 | Weston et al. |
| 9,531,846 B2 * | 12/2016 | Han ...................... H04L 47/283 |
| 2008/0089228 A1 * | 4/2008 | Lin ........................ H04L 47/10 370/230 |
| 2008/0165723 A1 | 7/2008 | Kim |

(Continued)

FOREIGN PATENT DOCUMENTS

KR    10-0846344 B1    7/2008

OTHER PUBLICATIONS

"Low-latency adaptive streaming over TCP"; Ashvin Goel; Portland, Oregon, USA; Aug. 1, 2008.

(Continued)

*Primary Examiner* — Ajit Patel
(74) *Attorney, Agent, or Firm* — Jefferson IP Law, LLP

(57) ABSTRACT

Methods and apparatuses for controlling transmission control protocol (TCP) send buffers in communication systems are provided. The method includes identifying a current round-trip time (RTT) value and a minimum RTT value in the TCP and adjusting a size of the send buffer based on at least one of a current operation, the current RTT value, and the minimum RTT value in a congestion control scheme according to the TCP.

6 Claims, 11 Drawing Sheets

(56) References Cited

U.S. PATENT DOCUMENTS

| | | | |
|---|---|---|---|
| 2009/0175191 A1* | 7/2009 | Lin | H04L 43/0829 370/253 |
| 2009/0316579 A1* | 12/2009 | Tang | H04L 47/10 370/231 |
| 2011/0013516 A1* | 1/2011 | Black | H04L 43/0888 370/236 |
| 2011/0116373 A1* | 5/2011 | Lauer | H01Q 1/007 370/232 |
| 2014/0241163 A1 | 8/2014 | Lee et al. | |
| 2015/0036500 A1* | 2/2015 | Williams | H04L 47/193 370/235 |
| 2017/0104801 A1* | 4/2017 | Ver Steeg | H04L 65/60 |
| 2017/0118119 A1* | 4/2017 | Testicioglu | H04L 47/12 |
| 2018/0091431 A1* | 3/2018 | Burbridge | H04L 43/10 |

OTHER PUBLICATIONS

"Taming the elephants: New TCP slow start."; Sangtae Ha et al.; Raleigh, North Carolina, USA; Jan. 1, 2011.

* cited by examiner

METHOD AND APPARATUS FOR CONTROLLING SEND BUFFER OF TRANSMISSION CONTROL PROTOCOL IN COMMUNICATION SYSTEM

CROSS-REFERENCE TO RELATED APPLICATION(S)

This application claims the benefit under 35 U.S.C. § 119(a) of a Korean patent application filed on Jul. 21, 2016 in the Korean Intellectual Property Office and assigned Serial number 10-2016-0092784, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) THE REGENTS OF THE UNIVERSITY OF COLORADO, A BODY CORPORATE.

TECHNICAL FIELD

The present disclosure relates to methods and apparatuses for controlling transmission control protocol (TCP) send buffers in communication systems.

BACKGROUND

In communications systems, the transmission control protocol (TCP) is one of main Internet protocols (IPs) for reliable transmission of data packets among applications that run on a host over an IP network. As TCP implementations, various protocols have been developed to maximize throughput and ensure inter-flow fairness. TCP Vegas, Westwood, and Veno are among various TCP protocols as proposed to be specialized in wireless networks. High-speed TCP, cubic, fast, or other similar TCP protocols have also been introduced as protocols for networks with a large bandwidth delay product (BDP). Other TCP suggestions are the data packet center TCP (DCTCP) particularly intended for data packet centers, high-bandwidth ultra low latency (HULL), and other multi-path protocols that simultaneously utilize several transmission paths.

Such TCP protocols of the related art take account of schemes for minimizing delay that occurs within a round-trip time (RTT) measured on TCP. Obtaining minimized inter-application delay is critical, particularly when delay serves as a major issue like it does in real-time streaming applications. For example, application performance may significantly be influenced by the time period from when a data packet transmitting application sends a data packet down to a TCP sender (e.g., the time that the data packet is written in the socket) to when an application receives a data packet from a TCP receiver (e.g., the time that the data packet is read out from the socket).

The TCP protocols of the related art keep the size of the send buffer managed by the TCP sender as large as possible to maximize data packet throughput. For example, given the size of a congestion window, Linux multiplies the memory capacity taken up per data packet with the size of the congestion window, doubles the result to present a larger congestion window size, and determines the doubled value as the size of the send buffer. In the case of Linux, as the congestion window enlarges, the size of the send buffer sharply increases accordingly. As the send buffer managed by the TCP sender enlarges, a sufficient number of data packets may be secured which the TCP sender maybe sent at the earliest opportunity to maintain the maximum throughput. An excessive increase in the size of the send buffer, however, subjects data packets to significant time consumption in waiting for a chance of transmission in the TCP sender rather than being actually transported over the network. The increased inter-application delay may deteriorate the service quality of applications, particularly real-time streaming or video conference applications for which low delay is of importance. Therefore, a need exists for a scheme capable of minimizing inter-application delay without deteriorating the throughput of data packets in TCP.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for controlling a send buffer to minimize inter-application delay in a communication system.

According to an embodiment of the present disclosure, there are provided a method and apparatus for controlling the size of a transmission control protocol (TCP) send buffer used in a communication system depending on network contexts.

In accordance with an aspect of the present disclosure, a method for controlling a send buffer of a TCP in a communication system is provided. The method includes identifying a current round-trip time (RTT) value and a minimum RTT value in the TCP and adjusting a size of the send buffer based on at least one of a current operation, the current RTT value, and the minimum RTT value in a congestion control scheme according to the TCP.

In accordance with another aspect of the present disclosure, a method for controlling a send buffer of a TCP in a communication system is provided. The method includes if a normal response signal or a TCP acknowledgment is to be transmitted to an opposite device, determining a current operation in a congestion control scheme according to the TCP based on a round-trip time (RTT) value, determining a size of a congestion window based on a data packet received from the opposite device, identifying a current RTT value and a minimum RTT value in the TCP, and adjusting a size of a window to be transmitted to the opposite device based on at least one of the current operation, the size of the congestion window, the current RTT value, and the minimum RTT value.

In accordance with another aspect of the present disclosure, an apparatus for controlling a send buffer of a TCP in a communication system is provided. The apparatus includes a transceiver configured to transmit and receive data packets and a processor configured to identify a current round-trip time (RTT) value and a minimum RTT value in the TCP and adjust a size of the send buffer based on at least one of a current operation, the current RTT value, and the minimum RTT value in a congestion control scheme according to the TCP.

In accordance with another aspect of the present disclosure, an apparatus for controlling a send buffer of a TCP in a communication system is provided. The apparatus includes a transceiver configured to transmit and receive data packets and a processor configured to if a normal response signal or a TCP acknowledgment is to be transmitted to an opposite device, determine a current operation in a congestion control scheme according to the TCP based on a round-trip time (RTT) value, determine a size of a congestion window based on a data packet received from the opposite device through the transceiver, identify a current RTT value and a minimum RTT value in the TCP, and adjust a size of a window to be transmitted to the opposite device based on at least one of the current operation, the size of the congestion window, the current RTT value, and the minimum RTT value.

Prior to going into the detailed description of the disclosure, it might be effective to define particular words and phrases as used herein. As used herein, the terms "include" and "comprise" and their derivatives may mean doing so without any limitations. As used herein, the term "or" may mean "and/or." As used herein, the phrase "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to, "be bound to or with, "have, or "have a property of" As used herein, the term "controller" may mean any device, system, or part thereof controlling at least one operation. As used herein, the term "device" may be implemented in hardware, firmware, software, or some combinations of at least two thereof. It should be noted that functions, whatever particular controller is associated therewith, may be concentrated or distributed or implemented locally or remotely. It should be appreciated by one of ordinary skill in the art that the definitions of particular terms or phrases as used herein may be adopted for existing or future in many cases or even though not in most cases.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
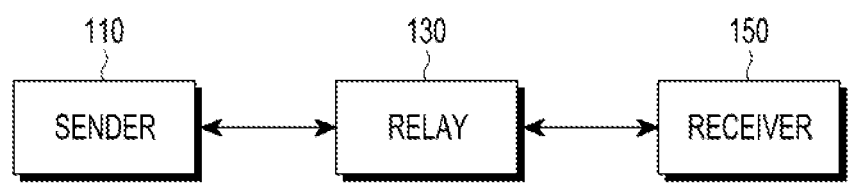
FIG. 1 is a view illustrating an example of a communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items.

The terms as used herein are provided merely to describe some embodiments thereof, but not to limit the present disclosure. It is to be understood that the singular forms "a," "an," and "the" include plural references unless the context clearly dictates otherwise. It will be further understood that the terms "comprise" and/or "have," when used in this specification, specify the presence of stated features, integers, operations, elements, and/or components, but do not preclude the presence or addition of one or more other features, integers, operations, elements, components, and/or groups thereof.

Unless otherwise defined, all terms including technical and scientific terms used herein have the same meaning as commonly understood by one of ordinary skill in the art to which the various embodiments of the present disclosure belong. Such terms as those generally defined in the dictionary should be appreciated to be consistent with contextual meanings of relevant technology.

According to an embodiment of the present disclosure, there is provided a method for minimizing inter-application delay without deteriorating the throughput of data packets on a communication system by enhancing the transmission control protocol (TCP) which is a major Internet protocol (IP).

To that end, there are provided a method and apparatus that control a send buffer managing data packets in the TCP according to an embodiment of the present disclosure. A method for controlling a TCP send buffer by each device included in a communication system is described below in detail with reference to the accompanying drawings.

FIG. 1 is a view illustrating an example of a communication system according to an embodiment of the present disclosure.

Referring to FIG. 1, a communication system includes a sender 110, a relay 130, and a receiver 150.

Referring to FIG. 1, the sender 110 is a wireless communication device that sends out data packets. The receiver 150 is a wireless communication device that is wirelessly connected with the sender 110 to receive data packets from the sender 110. The relay 130 is a device for connecting networks that are separate from each other and that use the same transport protocol. The relay 130 is a device for connecting together the sender 110 and the receiver 150. For example, the relay 130 may be a proxy server.

The sender 110 manages a send buffer to transmit data packets received from an application layer to the receiver 150. The sender 110 may sends data packets buffered in the send buffer to the receiver 150 using a congestion window. According to an embodiment of the present disclosure, there is provided a scheme for minimizing inter-application delay without deteriorating the data packet throughput of the sender 110 by adaptively controlling the send buffer managed by the sender 110 depending on network contexts.

According to an embodiment of the present disclosure, the method for adaptively controlling the send buffer managed by the sender 110 depending on network contexts may be performed by at least one of the sender 110, the relay 130, and the receiver 150.

An example in which the method for controlling the send buffer is performed by the sender 110 is described below with reference to FIGS. 2A and 2B according to an embodiment of the present disclosure.

Figure 2A:
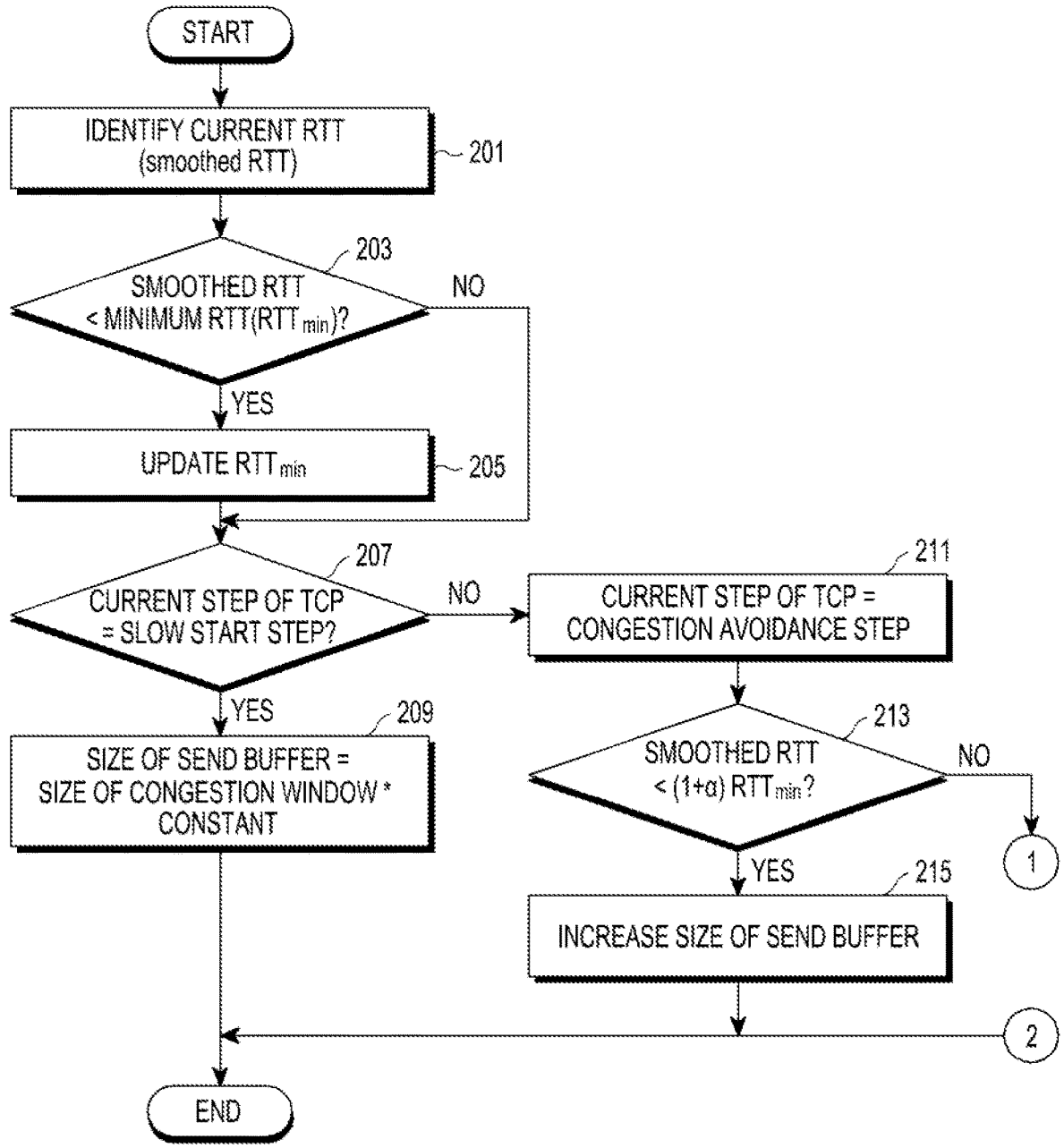
FIGS. 2A and 2B are views illustrating a method for controlling a send buffer by a sender in a communication system according to various embodiments of the present disclosure.
Figure 2B:
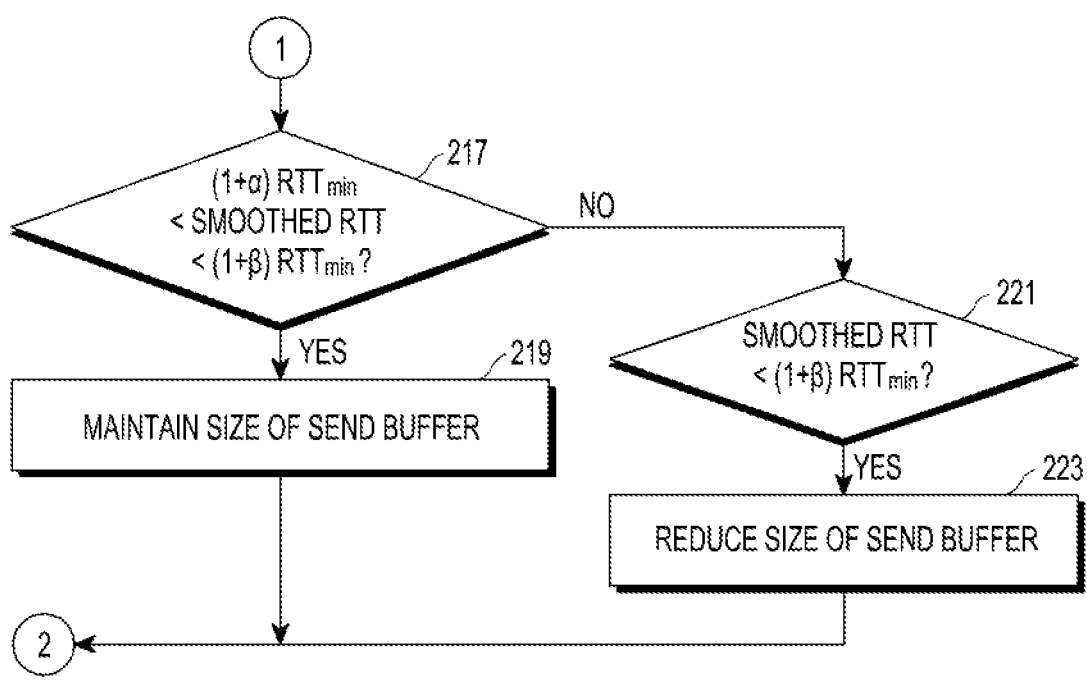

FIGS. 2A and 2B are views illustrating a method for controlling a send buffer by a sender in a communication system according to various embodiments of the present disclosure.

Referring to FIGS. 2A and 2B, when the send buffer is controlled by the sender 110, the sender 110 may directly control the size of the send buffer because the send buffer is included in the sender 110. In particular, the sender 110 identifies a current round-trip time (RTT) value to identify a network environment at operation 201. The current RTT value may be a RTT value measured latest in the TCP. The current RTT value may be assigned a high weight, and a resultant value may be represented. The represented value which is obtained by assigning the high weight to the current RTT value may be referred to as a smoothed RTT value.

The sender 110 determines whether the identified smoothed RTT value is smaller than a minimum RTT ($RTT_{min}$) value identified thus far at operation 203, and when the identified smoothed RTT value is smaller than the $RTT_{min}$ value, the sender 110 updates the $RTT_{min}$ with the identified smoothed RTT value at operation 205. By contrast, when the smoothed RTT value is larger than the $RTT_{min}$ value, the sender 110 abstains from updating the $RTT_{min}$ value and proceeds to operation 207.

Thereafter, the sender 110 controls the size of the send buffer based on the current operation of the TCP and the smoothed RTT value at operations 207 to 215. At this time, operations performed depending on congestion statuses in the congestion control scheme as per the TCP include a slow start operation and a congestion avoidance operation. As well known, the slow start operation is an operation that exponentially increases the amount of transmit data (i.e., the size of the congestion window) until a congestion is detected. The congestion avoidance operation is an operation that linearly increases the amount of transmit data (i.e., the size of the congestion window) after the congestion is detected.

Specifically, the sender 110 determines whether the current operation of the TCP is the slow start at operation 207. At this time, one of various methods of the related art may be used to determine whether the current operation of the TCP is the slow start operation. As an example, the sender 110 may determine that the slow start operation is a time before until the sender 110 receives, from the receiver 150, duplicate normal response signals (e.g., TCP acknowledgment) three times or more.

When the current operation of the TCP is the slow start operation, the sender 110 sets the size of the send buffer to a value to the product of a predetermined constant and the size of the congestion window at operation 209.

In contrast, unless the current operation of the TCP is determined to be the slow start operation, the sender 110 identifies that the current operation of the TCP is the congestion avoidance at operation 211. Upon identifying that the current operation of the TCP is the congestion avoidance operation, the sender 110 may control the size of the send buffer based on what is shown and described in connection with FIG. 3.

Figure 3:
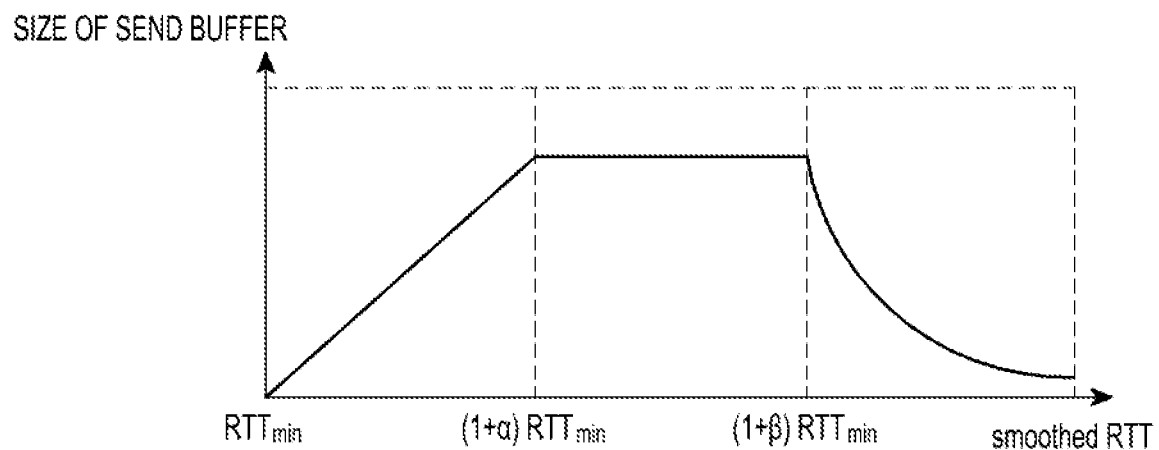
FIG. 3 is a view illustrating an example of a variation in size of a transmission control protocol (TCP) send buffer according to round-trip time (RTT) values according to an embodiment of the present disclosure.

FIG. 3 is a view illustrating an example of a variation in size of a TCP send buffer according to RTT values according to an embodiment of the present disclosure.

Referring to FIG. 3, the sender 110 adjusts the size of the send buffer given a difference in value between the smoothed RTT value and $RTT_{min}$. At this time, the difference in value between the smoothed RTT value and $RTT_{min}$ may be one of a variable determined depending on the network context, a predetermined constant, or a predetermined integer.

Specifically, when the smoothed RTT value is smaller than 1+α times $RTT_{min}$ at operation 213, the sender 110 gradually (or additively) increases the size of the send buffer at operation 215. As an example, the sender 110 may increase the size of the send buffer by an increment of one. When the smoothed RTT value is a value between (1+α) $RTT_{min}$ and (1+β)$RTT_{min}$ at operation 217, the sender 110 maintains the existing size of send buffer as shown in FIG. 3 at operation 219. When the smoothed RTT is larger than (1+β)$RTT_{min}$ at operation 221, the sender 110 sharply (or multiplicatively) reduces the size of the send buffer as shown in FIG. 3 at operation 223. Here, α is smaller than β, and α and β may be one of a variable determined depending on the network context, a predetermined constant, or a predetermined integer.

At this time, an increase in the smoothed RTT value may be attributed to an increase in the buffering load on the transmission path of the flow, increased inter-flow contention, or longer delay due to increased packet loss rate. In the network environment where the smoothed RTT value increases, it is thus required to reduce delay, which is detected by the application, by downsizing the base station. A decrease in the smoothed RTT value may be attributed to a decrease in the buffering load on the transmission path of the flow, decreased inter-flow contention, or shorter delay due to reduced packet loss rate. In the network environment where the smoothed RTT value decreases, it is therefore needed to transmit as many data packets as possible when the TCP has a chance of transmission by upsizing the send buffer. Upsizing the send buffer is gradually carried out to prevent a drastic increase in inter-application delay that may otherwise arise. Downsizing the send buffer is quickly done to rapidly respond to a deteriorated network circumstance.

A method for directly controlling the size of the send buffer by the sender 110 has been described above with reference to FIGS. 2A and 2B. Described below is a method for controlling the send buffer by the receiver 150 with reference to FIG. 4 according to an embodiment of the present disclosure.

Figure 4:
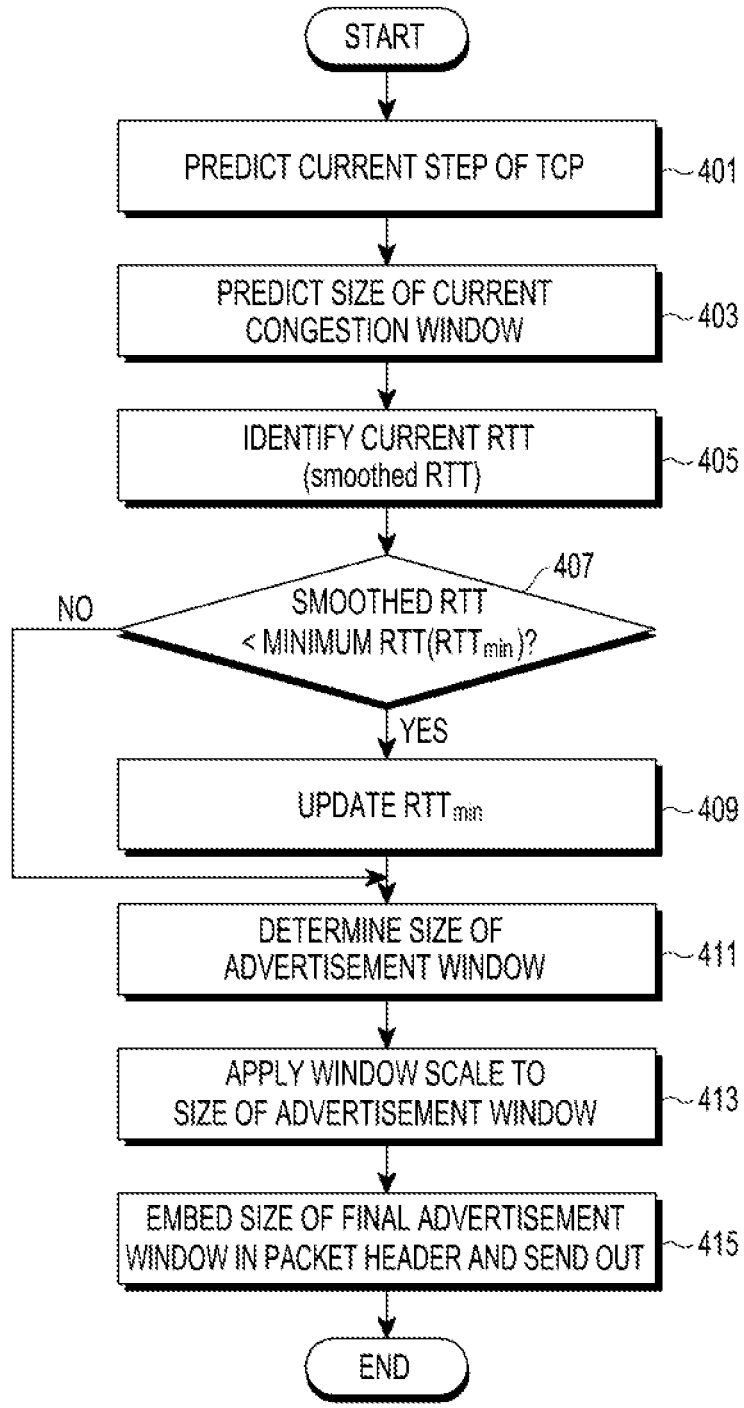
FIG. 4 is a view illustrating a method for controlling a send buffer by a receiver in a communication system according to an embodiment of the present disclosure.

FIG. 4 is a view illustrating a method for controlling a send buffer by a receiver 150 in a communication system according to an embodiment of the present disclosure.

Referring to FIG. 4, when the send buffer is controlled by the receiver 150, the receiver 150 may indirectly control the size of the send buffer because the send buffer is included in the sender 110. In particular, the receiver 150 predicts a current operation of the TCP based on a RTT when the receiver 150 sends a normal response signal to the sender 110 at operation 401.

The method for predicting the current operation of the TCP identifies whether the length of a packet train received from the sender 110 is larger than one-way delay (e.g., a half of the minimum RTT value) when the receiver 150 sends a normal response signal to the sender 110. Here, the packet train means a bundle of a plurality of data packets that the receiver 150 receives from the sender 110 during a single round. When the length of the packet train is equal or smaller than the one-way delay, the receiver 150 predicts that the TCP of the sender 110 is in the slow start operation, and when the length of the packet train is larger than the one-way delay, the receiver 150 predicts that the TCP of the sender 110 is in the congestion avoidance operation. At this time, when the time interval between when the last normal response signal is sent and the current time is larger than a predetermined value, the receiver 150 determines that it is a new round (i.e., a new packet train). The receiver 150 uses such approach because it cannot be exactly aware of a change to the packet train unlike the sender 110.

As another example, in the above method of predicting the current operation of the TCP, whenever receiving a new packet train, the receiver 150 calculates the RTT value using a predetermined number of first normal response signals of the packet train. When the RTT value calculated in a kth packet train is larger than the sum of a constant and the RTT value calculated in a k−1th packet train, the receiver 150 predicts that a bandwidth delay product (BDP) arrives and the TCP of the sender 110 is thus in the congestion avoidance operation. Here, the BDP is the product of bandwidth and delay and represents the maximum amount of data packets that may be transmitted through a particular path.

By contrast, when the RTT value calculated in the kth packet train is smaller than the sum of a constant and the RTT value calculated in the k−1th packet train, the receiver 150 predicts that the TCP of the sender 110 is in the slow start operation. Meanwhile, when the RTT value calculated in the kth packet train is equal to the sum of a constant and the RTT value calculated in the k−1th packet train, the receiver 150 may predict that the TCP of the sender 110 is in the congestion avoidance operation or slow start operation depending on the internal settings.

Next, whenever receiving a TCP data packet, the receiver 150 predicts the size of a congestion window determined by the sender 110 by adding a value obtained by dividing the length of the received data packet by a known (or advertised) maximum segment size (MSS) at operation 403.

Whenever receiving a new packet train, the receiver 150 identifies the current RTT (smoothed RTT) value at operation 405. The receiver 150 determines whether the identified smoothed RTT value is smaller than a minimum RTT ($RTT_{min}$) value identified thus far at operation 407, and when the identified smoothed RTT value is smaller than the $RTT_{min}$ value, the receiver 150 updates the $RTT_{min}$ with the identified smoothed RTT value at operation 409. By contrast, when the smoothed RTT value is larger than the $RTT_{min}$ value, the receiver 150 abstains from updating the $RTT_{min}$ value and proceeds to operation 411.

The receiver 150 determines the size of a window to be transmitted (or advertised) to the sender 110 based on the predicted current operation of TCP (i.e., the slow start operation or congestion avoidance operation), the predicted size of congestion window< and the smoothed RTT value and $RTT_{min}$ identified. At this time, the receiver 150 may determine the size of the advertisement window by a method similar to the method for determining the size of the send buffer by the sender 110. In other words, when the predicted current operation of the TCP is the slow start operation, the receiver 150 determines the size of the advertisement window by multiplying a predetermined constant with the predicted size of congestion window. When the predicted current operation of the TCP is the congestion avoidance operation, the receiver 150 may determine the size of the advertisement window using the smoothed RTT value and $RTT_{min}$ identified and the size of congestion window predicted based on FIG. 3 by the same method as operations 211 to 223 of FIGS. 2A and 2B.

The receiver 150 determines the size of the final advertisement window by applying a predetermined window scale to the determined size of advertisement window at operation 413. The receiver 150 includes the size of the final advertisement window in an advertisement window field of the packet header and sends the same to the sender 110 at operation 415.

By doing so, the receiver 150 may determine the size of a window output from the send buffer and indirectly control the send buffer.

A method for indirectly controlling the size of the send buffer by the receiver 150 has been described above with reference to FIG. 4. Now described is a method for controlling the send buffer by the relay 130 with reference to FIG. 5 according to an embodiment of the present disclosure. According to an embodiment of the present disclosure, the communication system may control the send buffer with the relay 130 without changing the internal configuration and operation of the sender 110 and the receiver 150.

Figure 5:
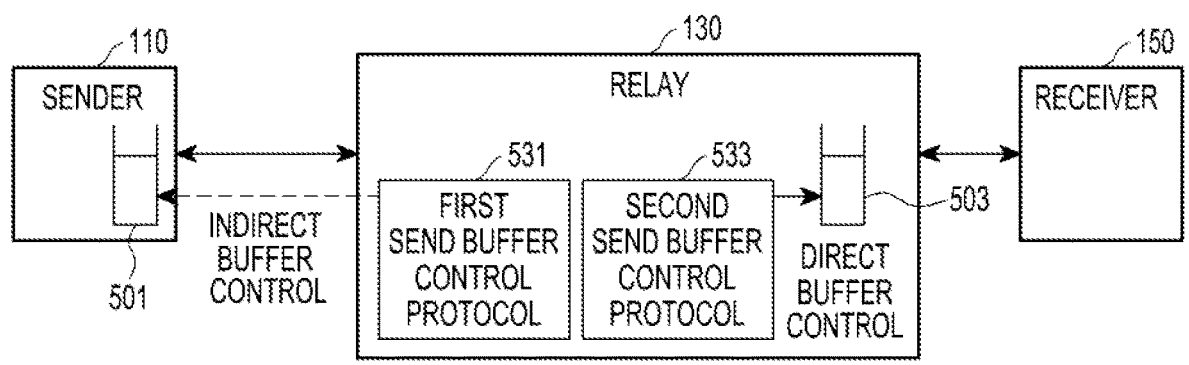
FIG. 5 is a view illustrating a method for controlling a send buffer by a relay in a communication system according to an embodiment of the present disclosure.

FIG. 5 is a view illustrating a method for controlling a send buffer by a relay in a communication system according to an embodiment of the present disclosure.

Referring to FIG. 5, the relay 130 may operate as a receiver when communicating with the sender 110 and as a sender when communicating with the receiver 150. Thus, upon communicating with the sender 110, the relay 130 indirectly controls the send buffer 501 included in the sender 110 by the same method (i.e., a first send buffer control protocol 531) as the receiver 150 as illustrated in FIG. 4. Upon communicating with the receiver 150, the relay 130 directly controls the send buffer 503 included in the relay 130 by the same method (i.e., a second send buffer control protocol 533) as the sender 110 as illustrated in FIGS. 2A and 2B. At this time, as the relay 130 performs both the first send buffer control protocol and the second send buffer control protocol, the relay 130 may carry out additional operations necessary therefor. Examples of the additional operations include the operation of controlling an internal buffer to prevent packet loss due to an overflow in packet delivery between a receive buffer managed by the first send buffer control protocol and a send buffer managed by the second send buffer control protocol inside the relay 130.

Thus, according to an embodiment of the present disclosure, inter-application delay may be minimized without deteriorating data packet throughput by adaptively controlling the send buffer 501 included in the sender 110 or the send buffer 503 included in the relay 130 depending on network contexts. According to an embodiment of the present disclosure, minimizing inter-application delay may be utilized to enhance the service quality of various applications to which delay matters. Various embodiments of the present disclosure may be carried out by one of the sender 110, the relay 130, and the receiver 150. Various embodiments of the present disclosure are thus applicable to various communication system environments.

A method for directly or indirectly controlling the size of the send buffer by the relay 130 has been described above with reference to FIG. 5. The respective internal configurations of the sender 110, the receiver 150, and the relay 130 performing various embodiments of the present disclosure are briefly described below with reference to FIGS. 6 to 8.

Figure 6:
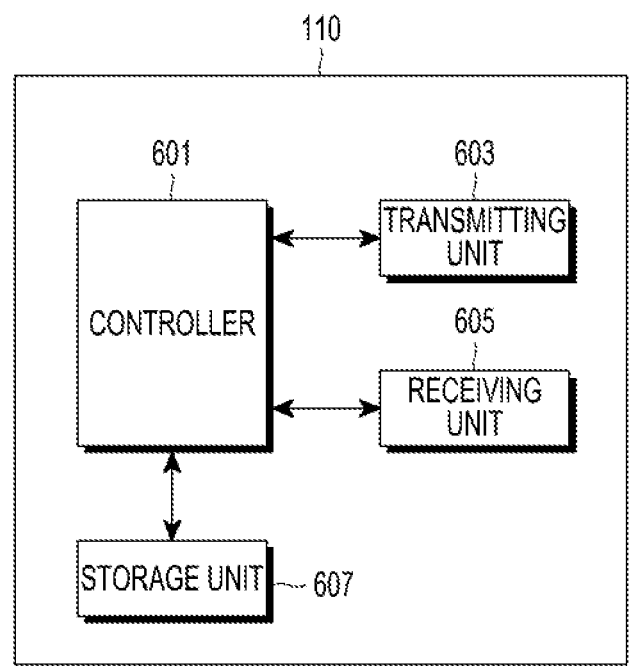
FIG. 6 is a view illustrating an internal configuration of a sender controlling a TCP send buffer in a communication system according to an embodiment of the present disclosure.

FIG. 6 is a view illustrating an internal configuration of a sender controlling a TCP send buffer in a communication system according to an embodiment of the present disclosure.

Referring to FIG. 6, the sender 110 includes a controller 601, a transmitting unit 603, a receiving unit 605, and a storage unit 607.

The controller 601 controls the overall operation of the sender 110, particularly, operations related to controlling the TCP send buffer according to an embodiment of the present disclosure. The operations related to controlling the TCP send buffer according to an embodiment of the present disclosure are the same as those described above in connection with FIGS. 1 to 3, and no detailed description thereof is repeated. The controller 601 may control the TCP send buffer by each, or a combination of two or more of, the various embodiments of the operations for controlling the TCP send buffer described above in connection with FIGS. 1, 2A and 2B, and 3.

The transmitting unit 603 transmits various signals and messages to other entities included in the communication system under the control of the controller 601. Here, the signals and messages transmitted by the transmitting unit 603 are the same as those described above in connection with FIGS. 2A and 2B, and no detailed description thereof is given.

The receiving unit 605 receives various signals and messages from other entities included in the communication system under the control of the controller 601. Here, the signals and messages received by the receiving unit 605 are the same as those described above in connection with FIGS. 2A and 2B, and no detailed description thereof is given.

The storage unit 607 stores a program(s) and various data packets related to the operation of controlling the TCP send buffer by the sender 110 under the control of the controller 601 according to an embodiment of the present disclosure. The storage unit 607 stores various signals and messages received by the receiving unit 605 from other entities.

Although FIG. 6 illustrates that the sender 110 includes separate units, such as the controller 601, the transmitting unit 603, the receiving unit 605, and the storage unit 607, the sender 110 may be implemented in such a manner that at least two of the controller 601, the transmitting unit 603, the receiving unit 605, and the storage unit 607 are integrated together. The sender 110 may also be implemented in a single processor.

Figure 7:
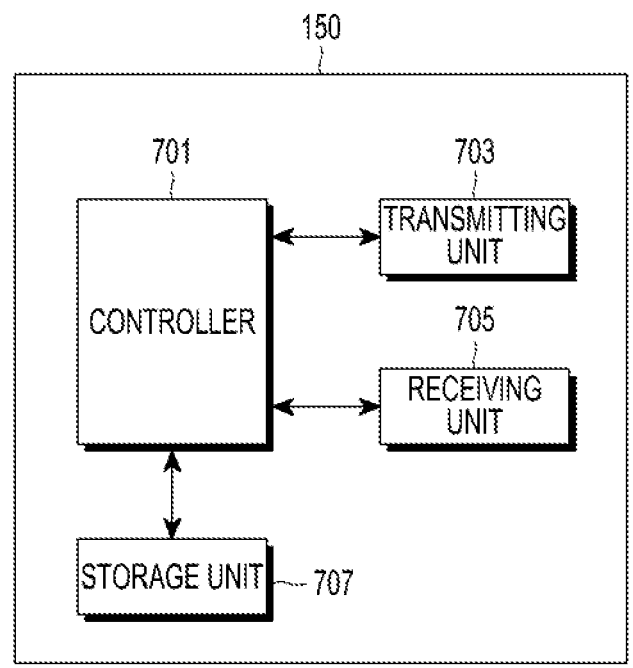
FIG. 7 is a view illustrating an internal configuration of a receiver controlling a TCP send buffer in a communication system according to an embodiment of the present disclosure.

FIG. 7 is a view illustrating an internal configuration of a receiver controlling a TCP send buffer in a communication system according to an embodiment of the present disclosure.

Referring to FIG. 7, the receiver 150 includes a controller 701, a transmitting unit 703, a receiving unit 705, and a storage unit 707.

The controller 701 controls the overall operation of the receiver 150, particularly, operations related to controlling the TCP send buffer according to an embodiment of the present disclosure. The operations related to controlling the TCP send buffer according to an embodiment of the present disclosure are the same as those described above in connection with FIG. 4, and no detailed description thereof is repeated.

The transmitting unit 703 transmits various signals and messages to other entities included in the communication system under the control of the controller 701. Here, the signals and messages transmitted by the transmitting unit 703 are the same as those described above in connection with FIGS. 1, 3, and 4, and no detailed description thereof is given. The controller 601 may control the TCP send buffer by each, or a combination of two or more of, the various embodiments of the operations for controlling the TCP send buffer described above in connection with FIGS. 1, 3, and 4.

The receiving unit 705 receives various signals and messages from other entities included in the communication system under the control of the controller 701. Here, the signals and messages received by the receiving unit 705 are the same as those described above in connection with FIG. 4, and no detailed description thereof is repeated.

The storage unit 707 stores a program(s) and various data packets related to the operation of controlling the TCP send buffer by the receiver 150 under the control of the controller 701 according to an embodiment of the present disclosure. The storage unit 707 stores various signals and messages received by the receiving unit 705 from other entities.

Although FIG. 7 illustrates that the receiver 150 includes separate units, such as the controller 701, the transmitting unit 703, the receiving unit 705, and the storage unit 707, the receiver 150 may be implemented in such a manner that at least two of the controller 701, the transmitting unit 703, the receiving unit 705, and the storage unit 707 are integrated together. The receiver 150 may also be implemented in a single processor.

Figure 8:
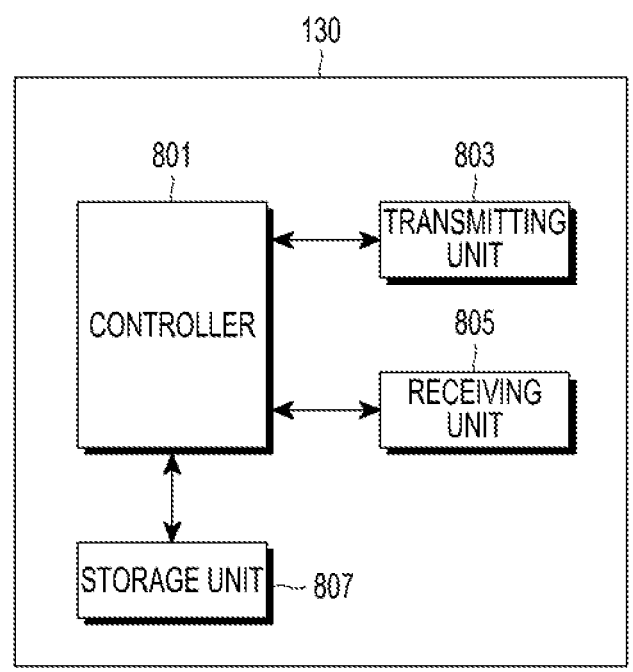
FIG. 8 is a view illustrating an internal configuration of a relay controlling a TCP send buffer in a communication system according to an embodiment of the present disclosure.

FIG. 8 is a view illustrating an internal configuration of a relay controlling a TCP send buffer in a communication system according to an embodiment of the present disclosure.

Referring to FIG. 8, the relay 130 includes a controller 801, a transmitting unit 803, a receiving unit 805, and a storage unit 807.

The controller 801 controls the overall operation of the relay 130, particularly, operations related to controlling the TCP send buffer according to an embodiment of the present disclosure. The operations related to controlling the TCP send buffer according to an embodiment of the present disclosure are the same as those described above in connection with FIGS. 1, 2A and 2B, and 3 to 5, and no detailed description thereof is repeated. The controller 601 may control the TCP send buffer by each, or a combination of two or more of, the various embodiments of the operations for controlling the TCP send buffer described above in connection with FIGS. 1, 2A and 2B, and 3 to 5.

The transmitting unit 803 transmits various signals and messages to other entities included in the communication system under the control of the controller 801. Here, the signals and messages transmitted by the transmitting unit 803 are the same as those described above in connection with FIGS. 2A, 2B, and 4, and no detailed description thereof is given.

The receiving unit 805 receives various signals and messages from other entities included in the communication system under the control of the controller 801. Here, the signals and messages received by the receiving unit 805 are the same as those described above in connection with FIGS. 2A, 2B, and 4, and no detailed description thereof is given.

The storage unit 807 stores a program(s) and various data packets related to the operation of controlling the TCP send buffer by the relay 130 under the control of the controller 801 according to an embodiment of the present disclosure. The storage unit 807 stores various signals and messages received by the receiving unit 805 from other entities.

Although FIG. 8 illustrates that the relay 130 includes separate units, such as the controller 801, the transmitting unit 803, the receiving unit 805, and the storage unit 807, the relay 130 may be implemented in such a manner that at least two of the controller 801, the transmitting unit 803, the receiving unit 805, and the storage unit 807 are integrated together. The relay 130 may also be implemented in a single processor.

The respective internal configurations of the sender 110, the receiver 150, and the relay 130 performing various embodiments of the present disclosure have been described above with reference to FIGS. 6 to 8. The results of application of methods for controlling a TCP send buffer in an actual communication system are described below with reference to FIGS. 9, 10A, 10B, 11A, and 11B.

Figure 9:
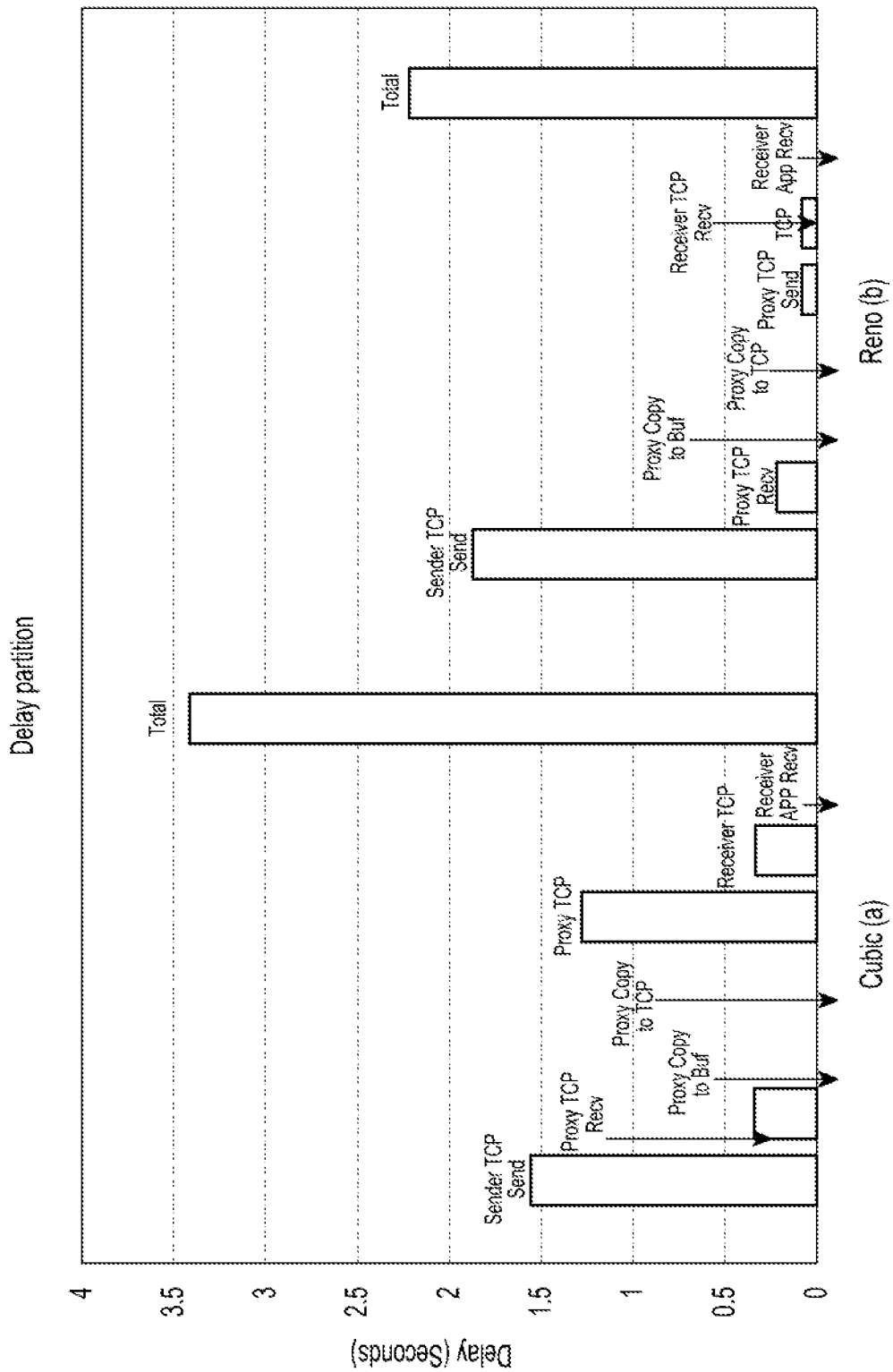
FIG. 9 illustrates the results of identifying a device where delay occurs on a TCP in a current communication system according to various embodiments of the present disclosure.

FIG. 9 illustrates the results of identifying a device where delay occurs on a TCP in a current communication system according to various embodiments of the present disclosure.

A Cubic(a) of FIG. 9 shows the results of identifying a device where delay occurs in cubic, and FIG. A Reno(b) of 9 shows the results of identifying a device where delay occurs in reno. It can be verified from FIG. 9 that a majority of delay occurs in the TCP send buffer of the sender 110. It can also be verified from A Cubic(a) of FIG. 9 that large delay occurs in the TCP send buffer of the relay 130 (e.g., a proxy server) in the case of cubic. In such a communication environment, application of a method for controlling a TCP send buffer according to an embodiment of the present disclosure to each of the sender 110, the relay 130, and the receiver 150 may lead to a maximized performance in light of delay and throughput on TCP as illustrated in FIGS. 10A, 10B, 11A, and 11B.

Figure 10A:
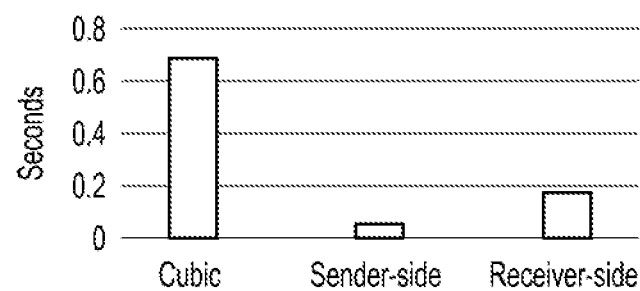
FIGS. 10A and 10B illustrate the results obtained by applying a method for controlling a TCP send buffer to a sender and a receiver in a communication system according to various embodiments of the present disclosure.
Figure 10B:
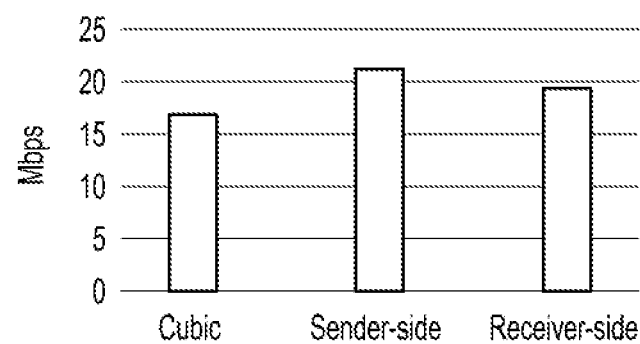

FIGS. 10A and 10B illustrate the results obtained by applying a method for controlling a TCP send buffer to a sender and a receiver in a communication system according to various embodiments of the present disclosure.

Referring to FIGS. 10A and 10B, the results shown in FIGS. 10A and 10B are one measured on one actual mobile communication network presently being operated by a communication service carrier. In particular, FIG. 10A shows comparison among a delay in existing cubic, a delay resulting from application of a method for controlling a TCP send buffer in the sender 110 according to an embodiment of the present disclosure, and a delay resulting from application of a method for controlling a TCP send buffer in the receiver 150 according to an embodiment of the present disclosure. FIG. 10A reveals that, as compared with the delay in existing cubic, the delay resulting from application of a method for controlling a TCP send buffer in the sender 110 according to an embodiment of the present disclosure and the delay resulting from application of a method for controlling a TCP send buffer in the receiver 150 according to an embodiment of the present disclosure has noticeably been reduced.

FIG. 10B shows comparison among a mean throughput in existing cubic, a mean throughput resulting from application of a method for controlling a TCP send buffer in the sender 110 according to an embodiment of the present disclosure, and a mean throughput resulting from application of a method for controlling a TCP send buffer in the receiver 150 according to an embodiment of the present disclosure. FIG. 10B reveals that the mean throughput in existing cubic, the mean throughput resulting from application of a method for controlling a TCP send buffer in the sender 110 according to an embodiment of the present disclosure, and the mean throughput resulting from application of a method for controlling a TCP send buffer in the receiver 150 according to an embodiment of the present disclosure are substantially the same.

Use, in a communication system, of one of a method for controlling a TCP send buffer in the sender 110 according to an embodiment of the present disclosure and a method for controlling a TCP send buffer in the receiver 150 according to an embodiment of the present disclosure may thus minimize delay and maintain a mean throughput as compared with using existing TCP.

Figure 11A:
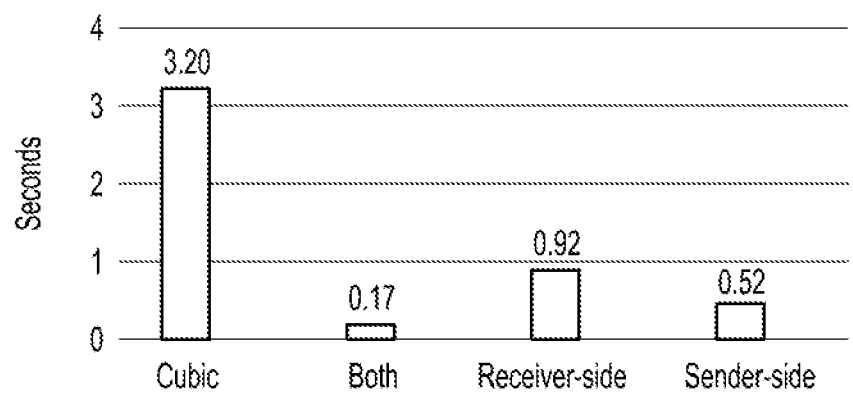
FIGS. 11A and 11B illustrate the results obtained by applying a method for controlling a TCP send buffer to a sender, a relay, and a receiver in a communication system according to various embodiments of the present disclosure.
Figure 11B:
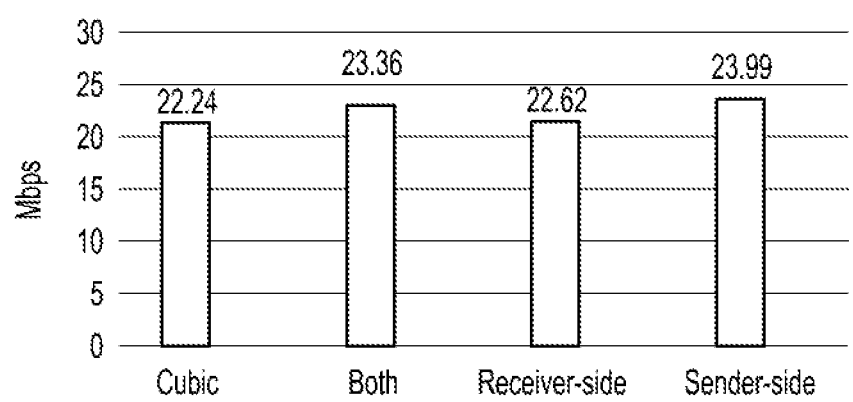

FIGS. 11A and 11B illustrate the results obtained by applying a method for controlling a TCP send buffer to a sender, a relay, and a receiver in a communication system according to various embodiments of the present disclosure.

Referring to FIGS. 11A and 11B, the results illustrated are measured on a mobile communication network operated by SK Telecom Co., Ltd, a South Korean wireless telecommunications operator. In particular, FIG. 11A shows comparison among a delay in existing cubic, delay resulting from application of a method for controlling a TCP send buffer in the relay 130 according to an embodiment of the present disclosure, a delay resulting from application of a method for controlling a TCP send buffer in the sender 110 according to an embodiment of the present disclosure, and a delay resulting from application of a method for controlling a TCP send buffer in the receiver 150 according to an embodiment of the present disclosure. FIG. 11A reveals that, as compared with the delay in existing cubic, the delay resulting from application of a method for controlling a TCP send buffer in the relay 130 according to an embodiment of the present disclosure, the delay resulting from application of a method for controlling a TCP send buffer in the sender 110 according to an embodiment of the present disclosure, and the delay resulting from application of a method for controlling a TCP send buffer in the receiver 150 according to an embodiment of the present disclosure have been noticeably reduced.

FIG. 11B shows comparison among a mean throughput in existing cubic, a mean throughput resulting from application of a method for controlling a TCP send buffer in the relay 130 according to an embodiment of the present disclosure, a mean throughput resulting from application of a method for controlling a TCP send buffer in the sender 110 according to an embodiment of the present disclosure, and a mean throughput resulting from application of a method for controlling a TCP send buffer in the receiver 150 according to an embodiment of the present disclosure. FIG. 11B reveals that the mean throughput in existing cubic, the mean throughput resulting from application of a method for controlling a TCP send buffer in the relay 130 according to an embodiment of the present disclosure, the mean throughput resulting from application of a method for controlling a TCP send buffer in the sender 110 according to an embodiment of the present disclosure, and the mean throughput resulting from application of a method for controlling a TCP send buffer in the receiver 150 according to an embodiment of the present disclosure are substantially the same.

Thus, use, in a communication system, of one of a method for controlling a TCP send buffer in the sender 110 according to an embodiment of the present disclosure, a method for controlling a TCP send buffer in the relay 130 according to an embodiment of the present disclosure, and a method for controlling a TCP send buffer in the receiver 150 according to an embodiment of the present disclosure may minimize delay and maintain a mean throughput as compared with using existing TCP.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling a send buffer of a transmission control protocol (TCP) in a communication system, the method comprising:
   identifying a current round-trip time (RTT) value and a minimum RTT value in the TCP;
   determining whether a current operation in a TCP congestion control scheme is a slow start operation or a congestion avoidance operation;
   adjusting a size of the send buffer by multiplying a size of a congestion window with a predetermined constant if the current operation corresponds to the slow start operation; and
   adjusting the size of the send buffer based on a difference between the current RTT value and the minimum RTT value if the current operation corresponds to the congestion avoidance operation.

2. The method of claim 1, wherein the adjusting of the size of the send buffer comprises:
   if the current RTT value is less than a first threshold, increasing the size of the send buffer by a predetermined value;
   if the current RTT value is a value between the first threshold and a second threshold, maintaining the size of the send buffer; and
   if the current RTT value is greater than the second threshold, decreasing the size of the send buffer by a multiple of a predetermined value.

3. The method of claim 2,
   wherein the first threshold and the second threshold are determined based on the minimum RTT value, and
   wherein the second threshold is greater than the first threshold.

4. An apparatus for controlling a send buffer of a transmission control protocol (TCP) in a communication system, the apparatus comprising:
   a transceiver configured to transmit and receive data packets; and
   a controller configured to:
      identify a current round-trip time (RTT) value and a minimum RTT value in the TCP,
      determine whether a current operation in a TCP congestion control scheme is a slow start operation or a congestion avoidance operation,
      adjust a size of the send buffer by multiplying a size of a congestion window with a predetermined constant if the current operation corresponds to the slow start operation, and
      adjust the size of the send buffer based on a difference between the current RTT value and the minimum RTT value if the current operation corresponds to the congestion avoidance operation.

5. The apparatus of claim 4, wherein the controller is further configured to:
   if the current RTT value is less than a first threshold, increase the size of the send buffer by a predetermined constant or additively,
   if the current RTT value is a value between the first threshold and a second threshold, maintain the size of the send buffer, and
   if the current RTT value is larger than the second threshold, decrease the size of the send buffer by a multiple of a predetermined value or multiplicatively.

6. The apparatus of claim 5,
   wherein the first threshold and the second threshold are determined based on the minimum RTT value, and
   wherein the second threshold is greater than the first threshold.

* * * * *